US006302521B1

United States Patent
Ellson et al.

(10) Patent No.: US 6,302,521 B1
(45) Date of Patent: Oct. 16, 2001

(54) METHOD AND APPARATUS FOR EXPANDED COLOR SPACE IN ACOUSTIC INK PRINTING

(75) Inventors: Richard N. Ellson, Palo Alto, CA (US); David A. Mantell, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,080

(22) Filed: Nov. 24, 1999

(51) Int. Cl.[7] .................................................... B41J 2/205
(52) U.S. Cl. ................................. 347/43; 347/15; 358/75
(58) Field of Search .................................. 347/12, 15, 40, 347/41, 43; 358/75, 79, 80, 298

(56) References Cited

U.S. PATENT DOCUMENTS

| | | | |
|---|---|---|---|
| 4,635,078 | * 1/1987 | Sakurada et al. | 347/43 |
| 4,682,216 | * 7/1987 | Sasaki et al. | 358/79 |
| 4,908,712 | * 3/1990 | Uchiyama et al. | 347/15 |
| 5,268,610 | 12/1993 | Hadimioglu et al. | 310/320 |
| 5,473,446 | * 12/1995 | Perumal, Jr. et al. | 358/523 |
| 5,844,020 | * 12/1998 | Paine et al. | 523/161 |
| 6,042,211 | * 3/2000 | Hudson et al. | 347/15 |
| 6,193,345 | * 2/2001 | Feinn et al. | 347/12 |

OTHER PUBLICATIONS

B. Hadimioglu, et al., "Acoustic Ink Printing," *1992 IEEE*, pp. 929–935, 1992 Ultrasonics Symposium.

* cited by examiner

Primary Examiner—N. Le
Assistant Examiner—Lamson D. Nguyen
(74) Attorney, Agent, or Firm—Fay, Sharpe, Fagan, Minnich & McKee, LLP

(57) ABSTRACT

A system for printing an image includes a computing device, a first memory device, a second memory device, and a printing device. The memory devices communicate with the computing device. The first memory device stores original image data in a first color space. The second memory device stores data representing colors from the first color space in a second color space including a black color and three primary colors. The data represents colors within a dark region of the second color space as including at least the black color and at least one of the primary colors. The data represents colors within an intermediate region of the second color space as including at least any one of the colors in the second color space. The data represents neutral colors within a highlight region of the second color space as only including the black color. The printing device, which communicates with the computing device, applies a number of drops of each of four inks, corresponding to the colors defining the second color space, to a printing medium. Each drop has a size less then about 5 pico-liters.

19 Claims, 3 Drawing Sheets

METHOD AND APPARATUS FOR EXPANDED COLOR SPACE IN ACOUSTIC INK PRINTING

BACKGROUND OF THE INVENTION

The present invention relates to a color copying machine, a color printer, or a color facsimile apparatus that forms a color image including at least four (4) color components (e.g., yellow, magenta, cyan, and black). It finds particular application in conjunction with extending a color space defined using the four (4) color components, and will be described with particular reference thereto. However, it is to be appreciated that the present invention is also amenable to other like applications.

Acoustic ink printing ("AIP") uses acoustic radiation produced by an ejector to eject individual droplets on demand from a free ink surface. The droplets ejected from an AIP device are significantly smaller than those produced by devices used for other conventional printing methods (e.g., thermal ink jet printing). For example, a typical droplet produced by an AIP device is less than about ten (10) pico-liters (or often times even less than about two (2) pico-liters).

Relatively large spots make the conventional printing devices very capable of producing colors at the black end of the color gamut. However, the large spots also limit the production of highlight colors at the light end of the gamut (e.g., light grays) using only black printer ink.

Color in printed digital images results from the combination of a limited set of colors over a small area in "gray" values selected to integrate the desired color response. This is accomplished in many printing devices by reproducing so called "separations" of the image, where each separation provides varying gray values of a single primary color. When the separations are combined together, the result is a full color image.

The particular color of each separation depends on the "color space" being implemented. Two commonly used color spaces include red-green-blue ("RGB") and cyan-magenta-yellow ("CMY"). The RGB color space is additive (i.e., it uses the addition of select amounts of the primary colors to a black background, with an equal mixture of the three (3) primary colors producing white). In contrast, the CMY color space is subtractive (i.e., the cyan, magenta, and yellow inks remove the primary colors red, green, and blue, respectively, from light reflected off of a white background so that an equal mixture of the three (3) CMY inks produces black due to the absorption of all color).

In practice, color images are often printed in a cyan-magenta-yellow-black ("CMYK") color space. This color space is based upon the CMY color space, but attempts to improve the quality of "black" in the image and, at the same time, reduces the use of color inks. In theory, images can be printed using the CMY color space, with a mixture of the three (3) colors producing black. Printing with only cyan, magenta, and yellow inks, however, often results in a lighter output than black printer ink. Therefore, while the lighter black achieved from CMY is actually beneficial in the highlight region produced by conventional large-spot printers, the quality of dark blacks is diminished. The lighter output is due to impurities in the inks, the particular paper or other image recording media used, and the partial reflection of light instead of its complete absorption into the inks. Consequently, select use of black ink in place of the primary colors reduces expense and minimizes the total amount of ink used, which is often desirable in ink-jet and other printing applications where the ability of the recording substrate to absorb ink is limited.

Methods for converting from the CMY color space to the CMYK color space are commonly referred to as undercolor removal ("UCR") and gray-component replacement ("GCR"). UCR/GCR methods vary, but commonly involve examining the individual pixels of an image to determine the minimum of the three (3) cyan-magenta-yellow colors. One (1) or more of the three (3) colors are then adjusted according to the minimum amount of the three (3) colors (i.e., UCR). An equivalent amount of black ink is then added to account for the removal of the three (3) other colors (i.e., GCR). For example, if a given pixel of an image is represented in the CMY color space by C=0.5, M=0.4, and Y=0.25, then the black or K value would be based upon the lowest value (i.e., the Y value). In a 50% UCR/GCR method, K=50% of Y (i.e., K=50% of 0.25, or 0.125). The remaining CMY values would then each be reduced by 0.125 so that the resulting UCR/GCR pixel is represented by C=0.375, M=0.275, Y=0.125, and K=0.125. Of course, other UCR/GCR methods are known, but each seeks to determine the level of black for a given pixel, and to thereafter adjust the other colors accordingly to account for the addition of black ink.

UCR/GCR makes it possible to reduce the amount of consumption of cyan, magenta, and yellow inks and helps prevent over-saturation of the printing medium. Over-saturation is a concern with low-surface tension inks used in conventional printing devices. Furthermore, because the color of printer black ink is darker than the color of process black ("CMY black"), UCR/GCR makes is possible to produce a darker black ink than one produced by mixing cyan, magenta, and yellow inks. In other words, UCR/GCR extends the dark end of the color gamut.

Although UCR/GCR produces desirable results for conventional printing devices producing large spots and using low-surface tension inks, it limits dark colors from being produced using all four (4) printer inks in the CMYK color space. Furthermore, UCR/GCR limits the production of light-grays (i.e., highlight colors) from black printer ink alone. Small-spot printing devices, which typically use higher-surface tension inks, are capable of producing darker blacks using all four (4) of the printer inks in the CMYK color space and better highlight colors using black printer ink alone. Therefore, conventional UCR/GCR are not desirable printing methods for small-spot printing devices.

The present invention contemplates a new and improved method and apparatus for expanding a color space in acoustic ink printing which overcomes the above-referenced problems and others.

SUMMARY OF THE INVENTION

A printing device includes a means for determining respective densities of each of at least four colors, including three primary colors and a black color, which define a final color space, for producing a desired color in the final color space. Colors produced within a dark region of the final color space include a density of at least the black color and at least one of the three primary colors for expanding a gamut of the final color space. Colors produced within an intermediate region of the final color space include a density of any one of the four colors. Colors produced within a neutral highlight region of the final color space include a density of only the black color. Respective amounts of each of four printer inks is calculated as a function of the respective density determined for each of the four colors.

Each printer ink corresponds to one of the four colors. A number of drops for each of the respective printer inks is applied to a printing medium for achieving the calculated amount of each of the respective inks and the desired color. Each of the drops has a size less than about 5 pico-liters.

In accordance with one aspect of the invention, a look-up table associates the respective desired densities for each of the four printer inks with the desired color.

In accordance with a more limited aspect of the invention, the respective desired densities for each of the four printer inks associated with each desired color are determined using an error diffusion calculation.

In accordance with another aspect of the invention, the respective desired densities for each of the four printer inks associated with each desired color are determined using a halftone calculation.

In accordance with another aspect of the invention, the three primary colors include cyan, magenta, and yellow, and the final color space is defined by the cyan, magenta, yellow, and black colors.

In accordance with another aspect of the invention, the desired color is originally defined in a device independent color space such as red-green-blue or Lab color spaces. The look-up table associates the desired color with the respective amount of each of the four printer inks for transforming the desired color from the device independent color space to the final color space.

In accordance with an even more limited aspect of the invention, the means for applying is a direct ink marking device.

In accordance with a more limited aspect of the invention, the direct ink marking device is an acoustic ink printing device including at least one printhead.

In accordance with another aspect of the invention, at least one of the four printer inks includes a phase-change ink.

One advantage of the present invention is that darker colors may be produced using cyan, magenta, yellow, and black printer inks, without over-saturating a printing medium.

Another advantage of the present invention is that pixels of a given darkness can be printed with a smaller number of maximum drops per color from all four colors than the number of drops if black alone was used. This enables a four printhead system to print black more rapidly than a black printhead alone.

Another advantage of the present invention is that lighter highlight colors may be produced using only a black printer ink.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
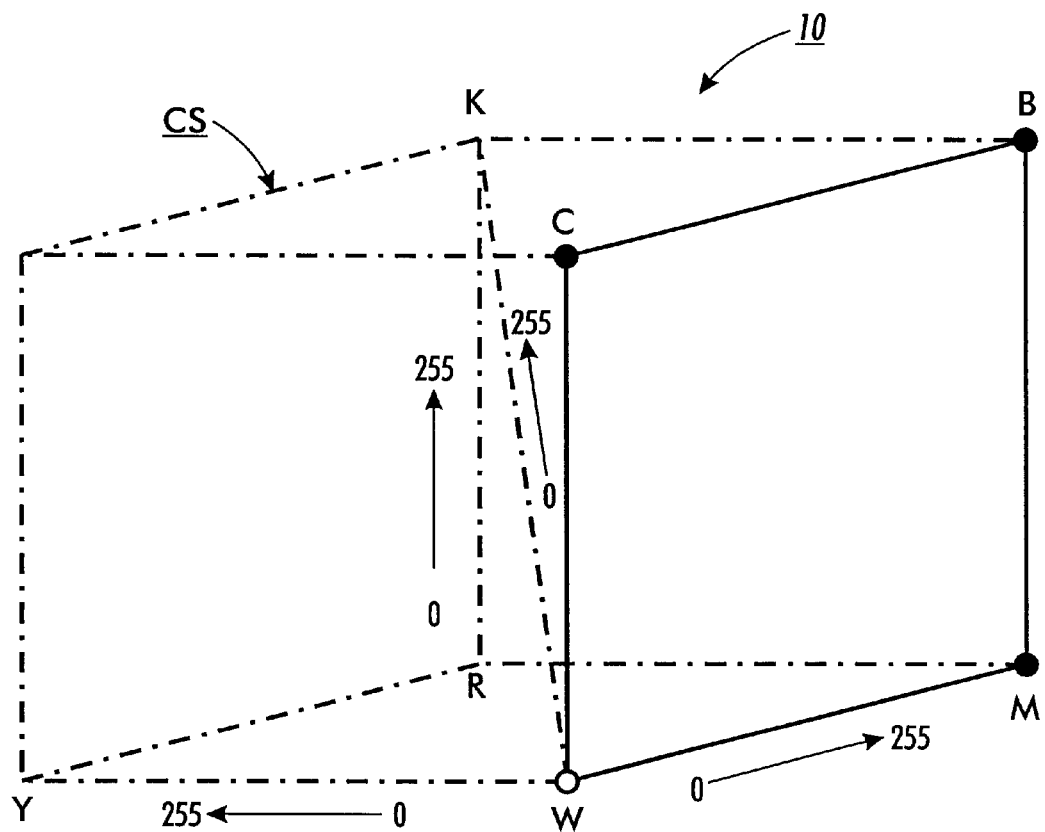
FIG. 1 illustrates a color space defined by cyan, magenta, yellow, and black.

FIG. 1 illustrates a cube 10 representing a cyan, magenta, yellow, and black ("CMYK") color space CS. The color space characterizes a gamut indicating a three-dimensional volume including every combination of the various colorants available for a particular printing apparatus. Starting at the lower corner W of FIG. 1, a white value indicates no colorant is placed for a particular pixel in an image to be printed. Three (3) axes extend from the lower corner W. Numeric values are associated with points along each of the three axes. More specifically, the value of zero (0) is assigned to the lower corner W and the value of 255 is assigned to the point of full color saturation along the different directions. These three (3) directions represent contributions of three (3) primary colorants, cyan C, magenta M, and yellow Y. A fourth direction, along a diagonal line away from the left corner W toward the upper corner black K, represents different levels (e.g., shades) of a fourth colorant black. The more a particular colorant is apparent, the farther along any particular axis and, consequently, the higher the value (up to 255) of the particular color along the axis in the color space CS.

As discussed above, the black colorant improves the quality of dark colors in the image. Furthermore, the addition of the black colorant expands the gamut by making it possible to print darker colors.

Figure 2:
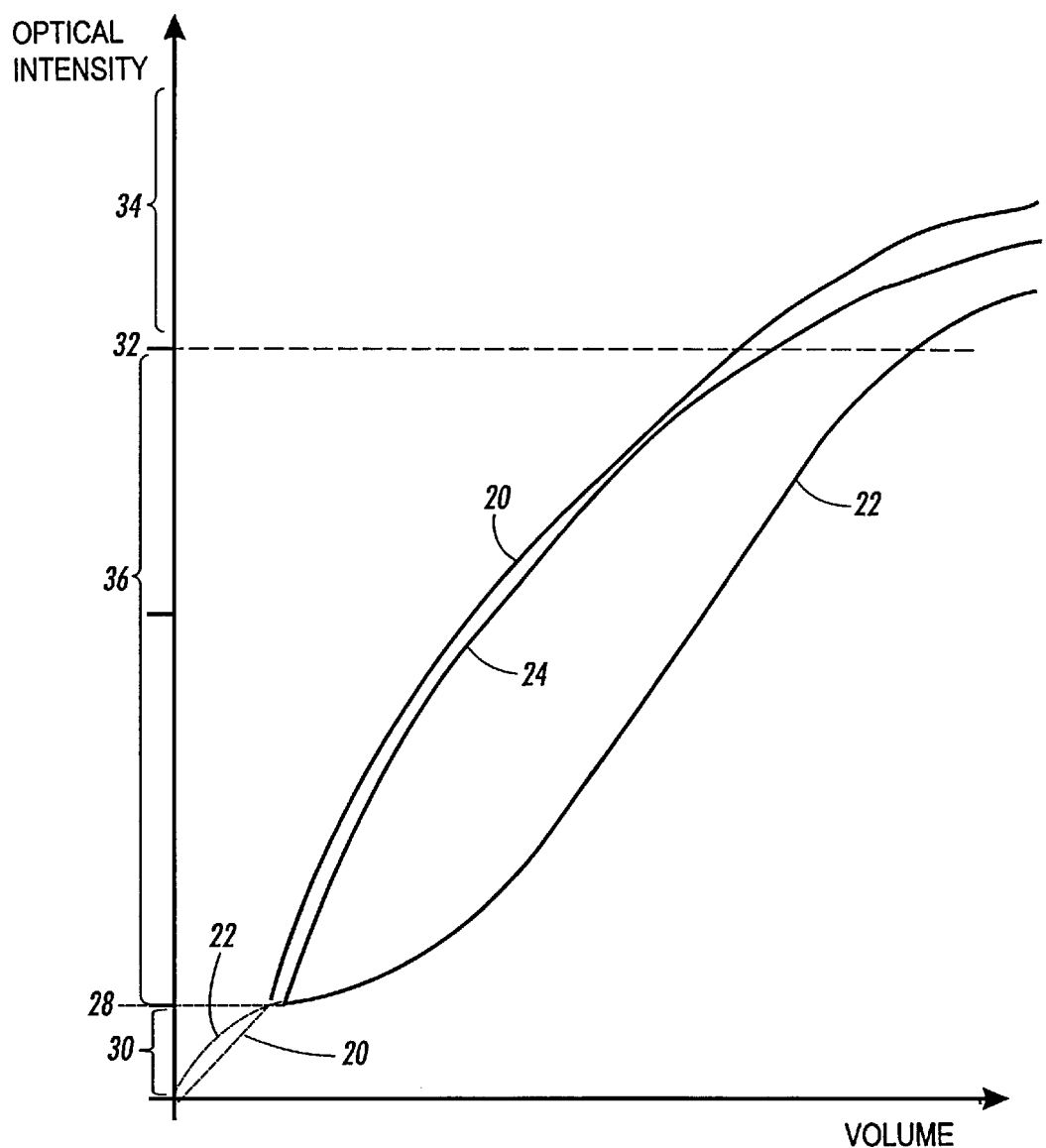
FIG. 2 illustrates a graph showing optical density versus ink volume for black printer ink, process black ink including cyan, magenta, and yellow, and process black ink including cyan, magenta, yellow, and black.

FIG. 2 illustrates three (3) curves showing optical intensity versus ink volume for black colors achieved with printers that produce relatively small drops (e.g., AIP devices). A first curve 20 illustrates the optical intensity achieved as the volume of black printer ink is varied. A second curve 22 illustrates the optical intensity achieved as the volume of process black ink including cyan, magenta, and yellow ("CMY") inks is varied. A third curve 24 illustrates the optical intensity achieved as the volume of process black ink including cyan, magenta, and yellow and black ("CMYK") inks is varied.

Highlight colors are represented in FIG. 2 below optical intensities at the point 28 (in the region designated as 30). Dark colors are represented above optical intensities at the point 32 (in the region designated as 34). Intermediate colors are represented between the points 28, 30 (in the region designated as 36). Highlight colors represent colors near the white W corner of the color space and dark colors represent colors near the black B corner. For example, highlight colors refer to light-gray colors along the continuum between the white W corner and the black B corner while dark colors refer to dark black colors along the same continuum. Intermediate colors are those shades of black between the highlight and dark colors.

The inks typically used in AIP devices preferably have relatively high-surface tensions. High-surface tension inks make it possible to apply inks to a printing medium (e.g., paper) and to have the ink colorant remain substantially on the surface. When high-surface tension inks are used, the printing medium does not become over-saturated and/or the inks do not run along the fibers of the paper, thereby reducing ragged line edges and bleeding through to the back side of the paper. While high-surface tension inks are disclosed in the preferred embodiment, it is to be understood that phase-change inks are also contemplated. Furthermore, in the preferred embodiment, the inks are applied to a medium that includes at least one coating for preventing the inks from fast drying. However, it is to be understood that other inks and printing mediums are also contemplated.

AIP devices are capable of producing very small droplets of ink on the printing medium. More specifically, AIP devices are capable of producing individual drops of ink that are less than about two (2) pico-liters in volume and make droplets on printing media under about 20 microns in diameter. Droplets under about 20 microns are not visible by an unaided human eye. One advantage printing devices that produce relatively small drops have over other types of printing devices is that they are capable of producing finer increments along a color continuum, and in particular, these increments can be produced close to the white point of the color space. For printers that produce larger drops, the equivalent optical densities are produced by further spacing out the drops. To an observer, this does not appear as a uniform gray color but, instead, as distinct isolated drops.

Because AIP devices are capable of producing finer increments along a color continuum, such devices make it possible to produce highlight colors (e.g., lighter shades of gray) using black printer ink instead of process black ink. As illustrated in FIG. 2, the curve 20 is capable of producing the lightest optical densities of black color in the highlight regions per volume of ink relative to the CMY or CMYK process ink. Such lighter optical densities in the highlight region 30 are desirable.

The curves 20, 22, 24 of FIG. 2 indicate that approximately equal optical densities of black color per volume of ink in the intermediate region 36 are achieved from black printer ink (curve 20) and the CMYK ink (curve 24) while the lowest optical density is achieved from CMY process black ink (curve 22). Furthermore, the curve 24 indicates that in the dark region 34, the black ink provides a black color having a slightly higher optical density of black per volume of ink than either the CMYK process ink (curve 20) or the CMY process ink (curve 22). Although the optical density achieved from CMYK process ink (curve 24) in the dark region 34 is not higher than the optical densities achieved from the black printer ink (curve 20), there are advantages to printing colors in the dark region 34 using the CMYK process ink. More specifically, because CMYK process ink applies more ink to a printing medium, darker colors are achieved in a given amount of time relative to black printer ink or CMY process ink.

In order to achieve optimum contrast in a printed image, it is important to consider that printer black ink produces more reliable neutral gray colors than process black inks. Furthermore, the mid-tone printing regions 36 (i.e., where the process black ink is transitioned to printer black ink) contains noticeable artifacts when an observer easily sees variations from neutrality. There are problems for dark colors off the neutral axis in the dark printing regions. More specifically, colors in the dark region tend to be shadowed by the black ink, thereby causing abrupt transitions from dark neutral looking colors to the dark colors. For black colors, therefore, it is desirable to produce highlight black colors (i.e., light-grays) using only black printer ink. Similarly, it is desirable to produce intermediate and dark black colors using CMYK process ink. The CMYK process ink provides a smooth transition between the intermediate region and both the highlight and dark regions. The color, or the neutrality of it, is still dominated by the black ink in the mid-tone regions as opposed to the conventional case where it is dominated by the process black ink. Because AIP devices are capable of producing small drops of ink from multiple printheads, they are capable of quickly generating the desired color levels for achieving the optimum contrasts.

Figure 3:
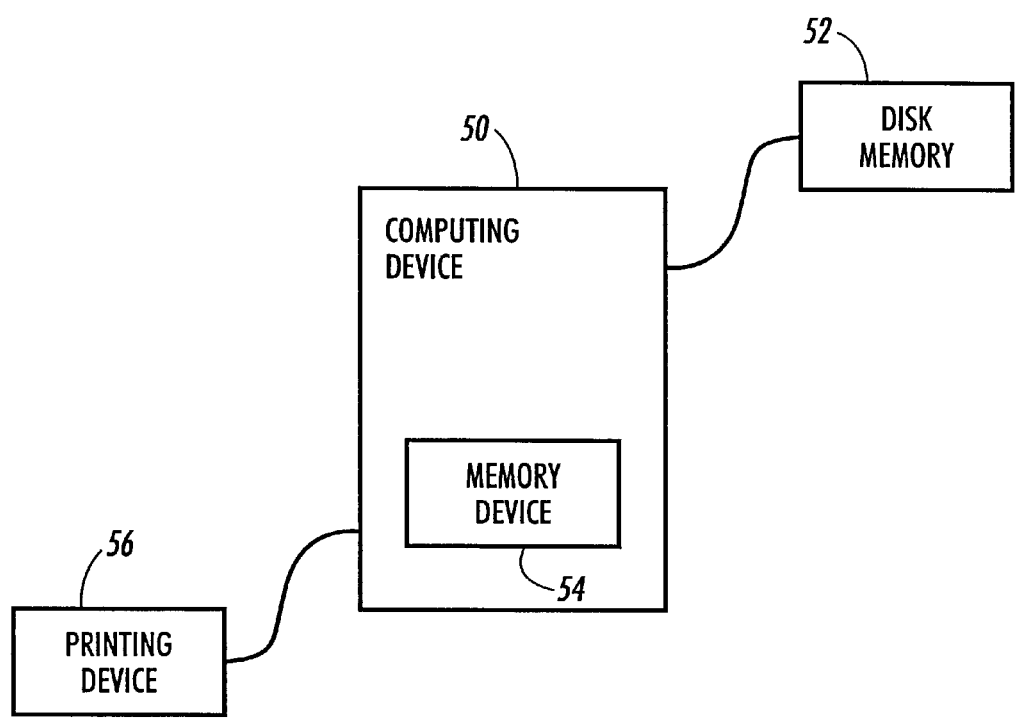
FIG. 3 illustrates a system for implementing the present invention.

As shown in FIG. 3, a computing device 50 generates a graphical picture to be printed. The graphical picture is generated, for example, by a graphics software application package running on the computing device 50. Alternatively, an original document is scanned into the computing device through a three-color scanner (not shown). In the preferred embodiment, the graphical picture includes color. However, a black-and-white and/or gray scale picture is also contemplated. The data for the graphical image is stored in a disk memory 52 that communicates with the computing system 50. Preferably, the graphical image is stored as red-green-blue ("RGB") data. However, it is also contemplated that the graphical image be represented as L*a*b color space or XYZ color space data. When it is desirable to print the graphical image, the RGB data is retrieved from the disk memory 52 into the computing device 50 where it is transformed into CMYK data. In the preferred embodiment, the graphical image is printed in real-time as the RGB data is retrieved from the disk memory 52 and transformed into the CMYK data.

Before the computing device 50 is used to print an image, a look-up table is created and stored in a memory device 54 of the computing device 50. The look-up table includes information for printing various shades of various colors for achieving optimum contrasts in printed images. More specifically, the look-up table associates RGB colors with respective amounts of the four (4) CMYK printer inks to achieve an image having an optimum contrast. In one embodiment, the look-up table associates RGB colors with respective numbers of drops for the four (4) CMYK printer inks.

The data in the look-up table is calculated as a function of the characteristics of a specific printer and printing medium. For example, the data stored in the look-up table is calculated as a function of the number of printer heads on the printer, the drop size and drop density produced by the printer on the printing medium, and a sequence defining an order for printing the drops from the respective printheads, etc. In the preferred embodiment, the data in the look-up table is determined using an error diffusion calculation. Alternatively, the data is determined using a halftone and/or stochastic halftone calculation.

In the preferred embodiment, the look-up table is calibrated for an AIP device, which has multiple printheads capable of printing small drops on the printing medium using high-surface tension inks. The data stored in the look-up table that corresponds to highlight colors (e.g., light-grays) cause the AIP device to print highlight colors using only black printer ink. Similarly, the data stored in the look-up table cause the AIP device to print black colors in the intermediate and dark regions of the color gamut using at least one of the CMYK process inks; the data stored in the look-up table cause the AIP device to print black colors in the dark region of the color gamut using at least the black printer ink, along with at least one of the cyan, magenta, and yellow inks.

When it is desirable to print a graphical image, data representing each section (e.g., a pixel) of the image is read from the disk memory 52 into the computing device 50. The computing device 50 determines the color and shade for each respective pixel. Once the shade and color of a pixel are determined, the computing device 50 accesses printing data in the look-up table corresponding to the shade and color of the pixel. The computing device 50 renders the image as a function of the printing data. The printing data indicates the respective numbers of drops for each of the four (4) printer inks that will most closely produce the desired shade and color on a printing device 56. The computing device 50 then transmits instructions to the printing device 56 for producing the desired color. In the preferred embodiment, the printing device is an acoustic ink printer. However, other direct ink marking devices (e.g., thermal ink jet and piezo printing devices) are also contemplated.

For example, assume that shades of black color range between zero (0) and 255. Values in the range of zero (0) to 100 represent light grays; values in the range of 101 to 213 represent intermediate blacks; and values in the range of 214 to 255 represent dark blacks. Therefore, if it is determined that a pixel includes a black color having a shade value in the range of zero (0) to 100, black printer ink is used to produce the color on the printing medium. If it is determined that a pixel includes a black color having a shade value in the range of 101 to 213, CMYK process ink, along with UCR/GCR, is used to produce the black color. If the shade value is in the range of 214 to 255, black process ink, along with cyan, magenta, and yellow inks are used to produce the black color.

AIP devices typically include more than one printhead. Preferably, the droplets of ink are simultaneously ejected from the various printheads to increase the printing speed.

The present invention has been described in terms of expanding a color space along an axis from light-gray to dark-black. However, the invention is not limited to merely producing more shades of black colors. Instead, it is to be understood that the present invention is also applicable to producing more shades of all colors within a color gamut.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A printing device, comprising:
    means for determining respective densities of each of at least four colors, including three primary colors and a black color, defining a final color space, for producing a desired color in the final color space, colors produced within a dark region of the final color space including a desired density of at least the black color and at least one of the three primary colors for expanding a gamut of the final color space, colors produced within a neutral highlight region of the final color space including a desired density of only the black color, and colors produced within an intermediate region of the final color space including a desired density of any combination of the four colors, the desired densities of the black color and any of the three primary colors in the intermediate region being proportional for achieving a smooth transition from the intermediate region to both the dark region and the highlight region;
    means for calculating respective amounts of each of at least four printer inks as a function of the respective desired densities determined for each of the four colors, each printer ink corresponding to one of the four colors; and
    means for applying a number of drops for each of the respective printer inks to a printing medium for achieving the calculated amount of each of the respective inks and the desired color, each of the drops having a size less than about 5 pico-liters.

2. The printing device as set forth in claim 1, further including:
    a look-up table for associating the respective desired densities for each of the four printer inks with the desired color.

3. The printing device as set forth in claim 2, wherein the respective desired densities for each of the four printer inks associated with each desired color are determined using an error diffusion calculation.

4. The printing device as set forth in claim 2, wherein the respective desired densities for each of the four printer inks associated with each desired color are determined using a halftone calculation.

5. The printing device as set forth in claim 2, wherein:
    the desired color is originally defined in a device independent color space; and
    the look-up table associates the desired color with the respective amount of each of the four printer inks for transforming the desired color from the device independent color space to the final color space.

6. The printing device as set forth in claim 5, wherein the means for applying is a direct ink marking device.

7. The printing device as set forth in claim 6, wherein the direct ink marking device is an acoustic ink printing device including at least one printhead.

8. The printing device as set forth in claim 1, wherein the three primary colors include cyan, magenta, and yellow, the final color space being defined by the cyan, magenta, yellow, and black colors.

9. The printing device as set forth in claim 1, wherein at least one of the four printer inks includes a phase-change ink.

10. A system for printing an image, comprising:
    a computing device;
    a first memory device, communicating with the computing device, for storing original image data in a first color space;
    a second memory device, communicating with the computing device, for storing data representing colors from the first color space in a second color space including a black color and at least three primary colors, the data representing colors within a dark region of the second color space including at least the black color and at least one of the three primary colors, the data representing neutral colors within a highlight region of the second color space only including the black color, and the data representing colors within an intermediate region of the second color space including any combination of the four colors, densities of the black color and any of the three primary colors in the intermediate region being proportional for achieving a smooth transition between the dark region and the highlight region, respectively; and
    a printing device, communicating with the computing device, for applying a number of drops of each of four inks corresponding to the colors defining the second color space, the number of drops of each of the inks being applied to a printing medium for substantially producing colors corresponding to the first color space, each drop having a size less than about 5 pico-liters.

11. The system for printing an image as set forth in claim 10, wherein the data stored in the second memory device includes a look-up table.

12. The system for printing an image as set forth in claim 11, wherein the data in the look-up table identifies respective desired densities of each of the four colors for achieving respective desired colors.

13. The system for printing an image as set forth in claim 10, wherein the printing device includes a direct ink marking device.

14. The system for printing an image as set forth in claim 13, wherein the direct ink marking device includes an acoustic ink printer having at least one printhead.

15. The system for printing an image as set forth in claim 10, wherein the three primary colors of the second color space include cyan, magenta, and yellow.

16. The system for printing an image as set forth in claim 15, wherein the first color space is represented as a L*a*b* color space.

17. A method for printing an image, defined in an original color space, in a final color space defined by at least four colors, including three primary colors and a black color, the method comprising:

determining a desired color, defined in the original color space, of a current section of the image to be printed;

determining a representation of the desired color in the final color space as a function of data indicating respective amounts of each of the four respective colors in the final color space, the data representing colors in a dark region of the final color space with at least the black color and at least one of the primary colors, the data representing neutral colors in a highlight region of the final color space with only the black color, and the data representing colors in an intermediate region of the final color space with any combination of the at least four colors, the respective amounts of the black color and any of the three primary colors in the intermediate region being proportional for achieving a smooth transition between the dark region and the highlight regions, respectively; and printing a respective number of drops for each of the at least four respective colors for achieving the desired color, each of the drops being less than about 5 picoliters.

18. The method for printing an image as set forth in claim 17, the step of determining the desired color including:

accessing the data in a look-up table.

19. The method for printing an image as set forth in claim 18, the drops being printed with a direct ink marking device having at least one printhead, the step of printing including:

printing the drops of the colors from the at least one printhead in a sequence defined by the data in the look-up table, the sequence defining an order for printing the drops from the respective printheads.

* * * * *